United States Patent [19]
Carrillo

[11] 4,099,221
[45] Jul. 4, 1978

[54] PORTABLE CEILING REFLECTOR FOR PHOTOGRAPHY

[75] Inventor: Alfred A. Carrillo, San Antonio, Tex.

[73] Assignee: The Raymond Lee Organization, Inc., New York, N.Y.

[21] Appl. No.: 700,979

[22] Filed: Jun. 29, 1976

[51] Int. Cl.² .............................................. G03B 15/02
[52] U.S. Cl. ......................................... 362/18; 362/427
[58] Field of Search .................... 240/1.3, 52 R, 2 C

[56] References Cited
U.S. PATENT DOCUMENTS

| | | | |
|---|---|---|---|
| 3,550,519 | 12/1970 | Lewis | 240/1.3 X |
| 3,781,535 | 12/1973 | Larson | 240/1.3 |
| 3,970,835 | 7/1976 | Crete | 240/1.3 |

Primary Examiner—Richard L. Moses
Attorney, Agent, or Firm—Howard I. Podell

[57] ABSTRACT

A reflector assembly that serves as a portable ceiling for reflecting bounce flash to a photographed object. The assembly includes a support rod fastened to a first mounting bracket attachable to a camera, a second bracket rotatably fixed to the support rod for attachment to a photo flash unit and a third bracket rotatably fixed at the free end of the support rod to which a reflecting plate is fixed.

1 Claim, 4 Drawing Figures

U.S. Patent  July 4, 1978  4,099,221
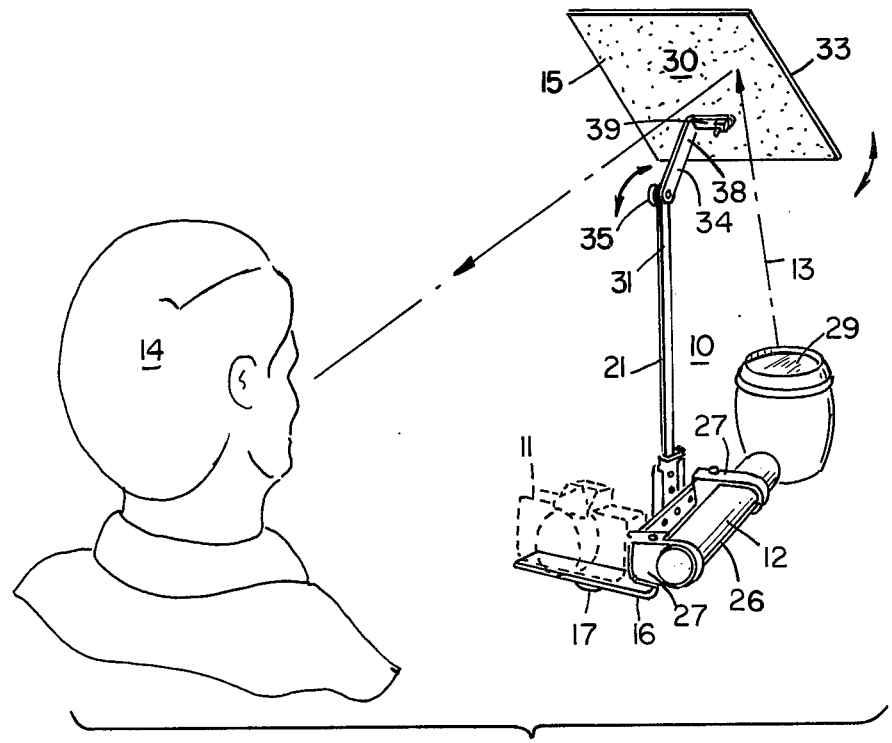
FIG. 1
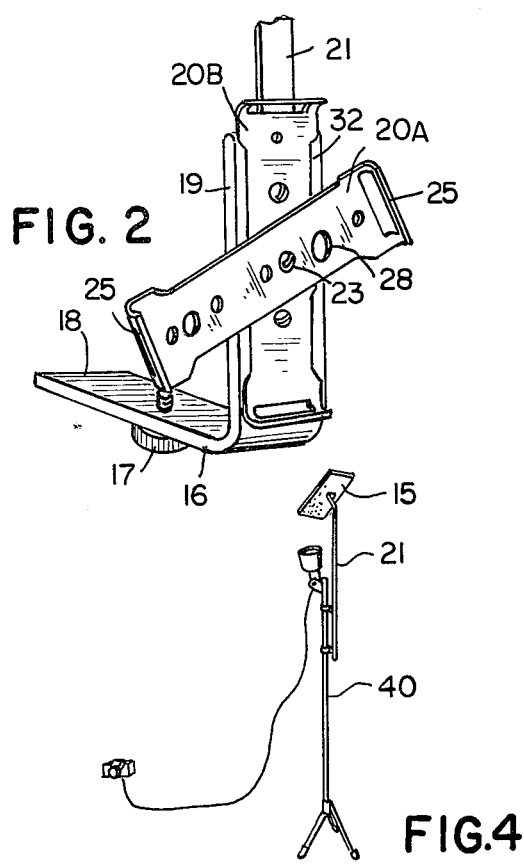
FIG. 2
FIG. 4
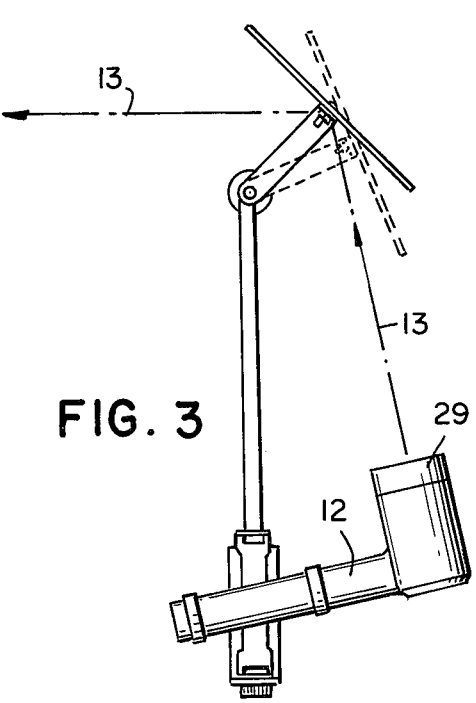
FIG. 3

PORTABLE CEILING REFLECTOR FOR PHOTOGRAPHY

SUMMARY OF THE INVENTION:

My invention is a reflector assembly that serves as a portable ceiling for reflecting bounce flash to a photographed object. The assembly includes a support rod fastened to a first mounting bracket attachable to a camera, a second bracket rotatably fixed to the support rod for attachment to a photo flash unit and a third bracket rotatably fixed at the free end of the support rod to which a reflecting plate is fixed.

By means of my invention, the photographer may achieve the lighting effects of bounce flash, which is caused by a diffused source of light above the camera and photographed object, regardless of the height of a ceiling and with heightened results for a given size of flash unit.

BRIEF DESCRIPTION OF THE DRAWINGS:

The objects and features of the invention may be understood with reference to the following detailed description of an illustrative embodiment of the invention, taken together with the accompanying drawings in which:

FIG. 1 is a perspective view of the invention in use;
FIG. 2 is a perspective detail view of the invention;
FIG. 3 is a side view of the invention; and
FIG. 4 is an elevation view of the invention mounted on a tripod.

DESCRIPTION OF THE PREFERRED EMBODIMENT:

Turning now descriptively to the drawings, in which similar reference characters denote similar elements throughout the several views, FIGS. 1-4 illustrate the flash reflector assembly 10 which is attachable in conventional fashion to a portable camera 11 for throwing the light rays 13 emitted by an attached flash unit 12 to a subject 14 being photographed in a diffuse manner from a reflector plate 15 located above the position of the camera 11 and the photographed subject 14.

Assembly 10 includes a camera mounting bracket 16 fitted with a captive rotatable screw 17 for attachment to the base of a camera 11. Bracket 17 is formed of two legs 18 and 19, bent at right angles to each other, with leg 18 generally held in the horizontal plane and leg 19 in the vertical plane in normal use of the assembly for portrait photography, and the terms horizontal, vertical and similar positional references will be employed in this description to represent such normal positions of use.

Vertical leg 19 is fixed to a vertical support member 21 that extends as a continuation of leg 19 away and upwards from leg 18.

A bracket 20A is rotatably joined to leg 19 by a pivot screw 23, with bracket 20A fitted with strap ears 25 for attachment to the body 26 of a photographic strobe flash unit 12 by conventional flash mounting brackets 27. An additional flash attachment bracket 20B may be fixed to leg 19 to mount a flash unit 12 in the conventional position alongside of attached camera 11 when bracket 20A is detached by removal of pivot screw 23.

A second screw 28 is fixed to bracket 20A to serve as a detent to bear against an edge 32 of bracket 20B with bracket 20A rotated at an angle to vertical leg 19 so that the light-emitting head 29 of the flash unit 12 attached to bracket 20A is focused towards the reflector 15 mounted at the upper end 31 of vertical support 21.

Reflector 15 is formed of a flat sheet 33 of material, the reflector face 30 of which may be formed or coated with a wrinkled or matte finish so as to diffuse reflected light. An angle bracket 34 formed of two mutually perpendicular legs 38, 39 is bolted, by leg 39 to the face 30 of reflector 15 with leg 38 rotatably fixed to end 31 of support member 21 by a bolt 35 so as to enable reflector face 30 to rotate from a generally horizontal plane to a vertical plane above camera bracket 16, with the preferred orientation of reflector face 30 being in a diagonal plane that reflects light rays 13 from the attached flash head 29 forwards and downwards from reflector face 30 to cast the flash light rays 13 on the photographed subject, forward of the camera 11, from a position above and behind the camera 11 for optimum portrait lighting effect.

As shown in FIG. 4, bracket 16 may be alternately fastened to a tripod stand 40, instead of a camera, by removal of camera attachment screw 17 and fitting leg 18 of bracket to a tripod head 37 by an appropriate screw 38.

Alternately a flash unit employing a swivel head may be substituted for the fixed head light unit 12.

Since obvious changes may be made in the specific embodiment of the invention described herein, such modifications being within the spirit and scope of the invention claimed, it is indicated that all matter contained herein is intended as illustrative and not as limiting in scope.

Having thus described the invention, what I claim as new and desire to secure by Letters Patent of the United States is:

1. A portable photographic reflector assembly unit adaptable for attachement to a camera and to a photographic flash unit comprising.
   a first mounting bracket, fitted with screw means to fasten to a camera
   a support member,
   a reflector member pivotably mounted to the support member, and,
   a second mounting bracket, fitted with means to mount a flash unit to said bracket,
   said first mounting bracket formed of two legs, generally perpendicular to each other, with the screw means rotatably fitted to a first leg of said bracket, and the support member fixed to the second leg of said bracket so as to extend along the axis of and beyond the said second leg,
   said reflector member comprising a substantially flat sheet of material bolted to a first leg of an angle member, with a second leg of said angle member bent generally perpendicular to said first leg and pivotally mounted to the support member so that said second leg pivots in a plane perpendicular to the plane of the axes of the legs of the first mounting bracket, said pivotal travel of said second leg causing the flat sheet to be pivotable from a generally horizontal plane to a generally vertical plane or alternatively to be set in a desired diagonal plane between said horizontal and vertical planes when the support member extends along a vertical axis,
   said second mounting bracket being pivotally mounted to said support member so as to be pivotally mounted in a plane parallel to the plane in which said second leg pivots such that a flash light unit attached to said second mounting bracket may be oriented with the light rays from said flash unit directed at an adjustable position towards a face of the reflector member.

* * * * *